Figure 1:
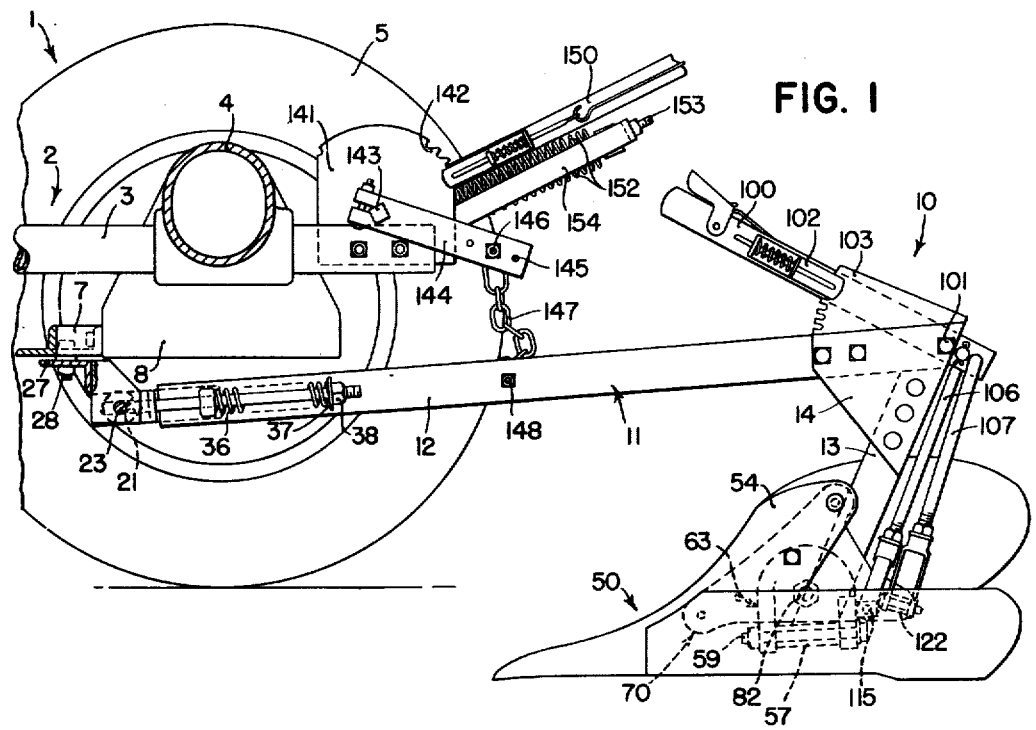

Aug. 28, 1945.  A. E. YOUNG  2,383,698

PLOW

Original Filed Feb. 3, 1941

Inventor

AUSTIN E. YOUNG

Patented Aug. 28, 1945

2,383,698

UNITED STATES PATENT OFFICE 2,383,698

PLOW

Austin E. Young, Syracuse, N. Y., assignor to Syracuse Chilled Plow Co., Inc., Syracuse, N. Y., a corporation of New York Original application February 3 1941, Serial No. 377,095. Divided and this application September 4, 1942, Serial No. 457,526

15 Claims. (Cl. 97—199)

This application is a division of my co-pending application, Serial No. 377,095, filed February 3, 1941, now United States Patent 2,340,165, issued January 25, 1944.

The object and general nature of the present invention is the provision of a new and improved hitch construction for plows, particularly those known as integral plows and connected with the associated tractor. More particularly, it is a feature of this invention to provide a hitch arrangement which is effective to hold the associated plow beam in upright position but which does not interfere with desired lateral movement of the plow beam with respect to the tractor or other supporting means. Still further, another feature of this invention is the provision of a hitch connection, particularly adapted for use with two-way plows, but not necessarily limited thereto, in which adjustments in the hitch for the use of plow bottoms of different widths is easily and conveniently made, yet without losing the advantage of holding the plow beam in the desired upright position at all times. An additional feature of the present invention is the provision of a plow hitch in which it is unnecessary to change the tread of the tractor when changing to plow bottoms of different widths. Still further, another feature of this invention is the provision of a hitch connection of this kind which includes cushioning or yielding means relieving the plow bottom or bottoms of shock stresses, which might otherwise occur when obstructions and the like are encountered.

These and other objects and advantages of the present invention will be apparent to those skilled in the art after a consideration of the following detailed description, taken in conjunction with the accompanying drawing illustrating the preferred embodiment of my invention.

Figures 2, 3:
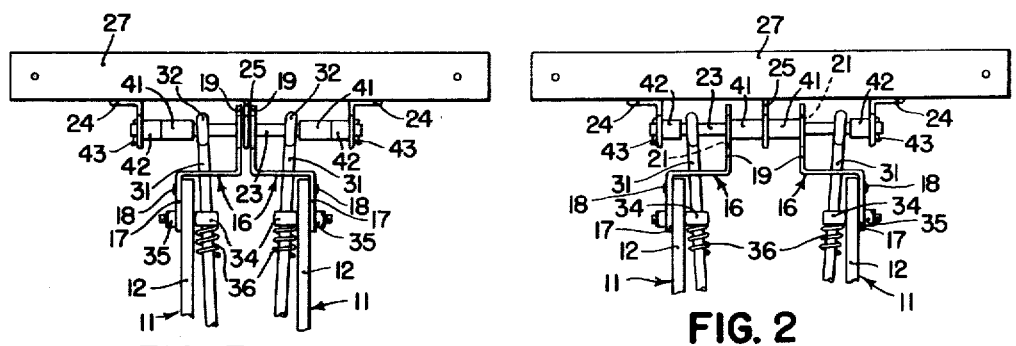

In the drawing:

Figure 1 is a side view of a tractor two-way plow in which the principles of the present invention have been incorporated; and Figures 2 and 3 show the details of the hitch connection and the two optional arrangements by which the right and left hand plow beams are connected with the tractor and held in upright position.

Referring now to the drawing, particularly Figure 1, the reference numeral 1 indicates in its entirety a farm tractor which may be of any suitable construction and which is therefore shown only fragmentarily. The tractor 1 includes a frame 2 having frame bars 3, the frame 2 serving as a supporting and propelling means for the plowing units with which the present invention is more particularly concerned. The tractor 1 also includes a rear axle structure 4 and rear wheels 5, and the tractor is usually provided with a transverse drawbar, such as the one indicated by the reference numeral 7, the latter being fixed to the tractor 1 in any suitable manner, preferably to the rear axle drive housings 8 which form a part of the rear axle structure 4. Preferably, the tractor drawbar 7 is in the form of an angle bar having apertures to which implements may selectively be attached.

The present invention is disclosed in a two-way plow, but since the right and left hand plowing units are identical, except that one is a right hand unit and the other a left hand unit, a detailed description of one unit will suffice. Also, it is to be understood that the present invention is not necessarily limited to two-way plows but may be embodied in other types of plows.

The right hand plowing unit is indicated in its entirety by the reference numeral 10 and includes a plow beam 11 of more or less conventional construction, consisting of a bar 12 and a downwardly disposed standard 13 fixed to the bar 12 by one or more plates 14 bolted and/or riveted to the associated members. A member 16 of Z formation has one leg 17 secured, as by a rivet 18, to the front end of the bar 12, and the other leg 19 of the member 16 is slotted, as at 21, to receive a transverse draft rod 23. The latter is carried in apertured brackets 24 and 25 that are welded to a transverse angle 27 which is adapted to be bolted, as at 28, to the tractor drawbar 7 adjacent the ends thereof. It will be noted that by virtue of the Z-bar 16, the end 19 thereof is connected in laterally offset relation to the draft rod 23, being laterally inwardly of the beam 11 when the parts are arranged as shown in Figure 3. The power of the tractor is transmitted directly to the beam 11 by means of a pull rod 31 having an eye 32 encircling the adjacent end of the transverse draft rod 23. The rear end of the pull rod 31 extends rearwardly through an eye-bolt 34 that is fixed, as by a nut 35, to the front end of the beam 11. The eye-bolt also serves to fasten the Z member 16 to the front of the plow beam, as best shown in Figure 3. A spring 36 is disposed about the rear portion of the pull rod 31 and at its rear end engages a washer 37, the position of which is governed by an adjusting nut 38 screwed onto the rear threaded end of the pull rod. Thus, the forward pull is transmitted from the tractor to the plow through a spring cushion hitch, as just described, which reduces the shock of striking an obstruction when plowing.

From Figure 3, it will be noted that the eye 32 of the pull rod 31 embraces the draft rod 23 an appreciable distance laterally outwardly beyond the slotted end 19 of the Z-shaped member 16. The aperture in the latter, through which the pull rod 31 extends, forms a snug fit, and since the rear portion of the pull rod 31 is disposed in the eye of the bolt 34 it will be seen that the plow beam 11 is held against movement about a generally longitudinal axis, or, in other words, the plow beam is held in an upright position relative to the tractor but is permitted to swing generally vertically about the draft rod 23 as an axis. The slot 21 accommodates longitudinal movement of the plow beam 11 and also permits the plow beam to swing laterally a limited amount, generally about the eye 32 as a center, but does not minimize the restraint against lateral tilting of the plow beam.

The position of the hitch connection for each plow beam on the draft rod 23 may be varied to permit the use of plow bottoms of different widths. For example, when plow bottoms of fairly wide construction are utilized, the plow beam 11 is disposed (Figure 3) with the end 19 of the member 16 substantially up against the central bracket 25, and in order to hold the beam in this position, a pair of spacers 41 and 42 are placed on the draft rod 23 laterally outwardly of the pull rod 31. It will be understood that the draft rod 23 is loosely supported in the brackets 24 and 25, and may be held removably in position therein by cotter keys 43 or other suitable means. When it is desired to use more narrow bottoms, the hitch connections are shifted into the positions shown in Figure 2, with the longer of the two spacing sleeves 41 disposed between the end 19 and the center bracket 25. This change of hitch when using plow bottoms of different widths is desirable in order that the tractor wheels may operate properly in the previously opened furrow, and by this means it is unnecessary to change the tread of the tractor when changing to plow bottoms of different widths. According to the present invention, therefore, this implement may be used effectively with tractors of fixed tread.

The present invention is particularly concerned with the hitch connections just described and is not concerned with the details of the plow bottom and associated controls which are incorporated in the right and left hand units, these latter improvements constituting the subject matter of my parent application, identified above. For the purpose of this disclosure it will therefore be sufficient to note that the plow bottom 50 is of the conventional moldboard type and is mounted on a frog 54 which is connected to the plow beam standard 13 by means affording simultaneous depth and leveling adjustments, which means includes a sleeve 57 fixed to the lower end of the standard 13 and receiving a pivot bolt 59 to which a swivel block 63 is pivotally connected, the plow beam being pivoted, as at 82 with the central portion of the swivel block 63. To facilitate this connection, the plow bottom 50 carries an attaching plate or casting 70 suitably bolted thereto.

A combined depth and leveling lever 100 is mounted on a pivot bolt 101, which may be one of the bolts fixing the plates 14 to the beam 12. The lever 100 is provided with a conventional detent mechanism 102 which cooperates with a sector 103 fixed to the beam 12. The end of the lever 100 extends rearwardly beyond the pivot bolt 101 and is pivotally connected with the upper ends of a pair of links 106 and 107 which at their lower ends are connected, as at 115 and 122, with the members 63 and 70.

The plows may be raised into transport position out of engagement with the ground by any suitable means. Preferably, I mount a bracket 141 on the rear end of each of the frame bars 3, the bracket being formed with a sector section 142 and is apertured to receive a short shaft 143. An arm 144 is connected to the shaft 143 and at its outer end is provided with a plurality of apertures 145 to receive a bolt 146 to which the upper end of a chain 147 is connected. The lower end of the chain is connected, as at 148, to the associated plow beam 11. A hand lever 150 is fixed to the shaft 143 so that by swinging the hand lever 150 forwardly the lifting lever 144 is raised and acts through the chain 147 to raise the associated plow into transport position. The weight of the plow may be counterbalanced by suitable springs 152 anchored at their rear ends by an adjusting bolt 153 to a bracket 154 fixed to the plate 141. The forward ends of the springs 152 may be connected to an arm on the shaft 143 or connected in any suitable manner to the lower forward end of the hand lever 150 forward of the shaft 143.

While I have shown and described above the preferred structure in which the principles of the present invention have been incorporated, it is to be understood that my invention is not to be limited to the specific details shown and described above, but that, in fact, widely different means may be employed in the practice of the broader aspects of my invention.

What I claim, therefore, and desire to secure by Letters Patent is:

1. A plow comprising means serving as a supporting frame, a plow beam, and means connecting said plow beam with said frame to accommodate generally vertical swinging movement relative thereto but preventing generally oscillatory movement of said beam relative to said supporting frame means about a generally longitudinal axis, said connecting means comprising a transverse bar on the supporting frame means, a first member fixed rigidly at one end to the plow beam so as to move therewith at all times, the other end being slotted and receiving said transverse bar, a second member engaging said transverse bar at a point spaced laterally of said first member and connected for relative movement longitudinally of said plow beam so as to move therewith at all times, and spring means resisting shifting movement of said second member relative to the plow beam.

2. A two-way plow comprising means serving as a supporting frame, a pair of plow beams, a transverse bar, a pair of brackets on said frame means receiving the ends of said transverse bar, means connecting each plow beam with said transverse bar, comprising a first member fixed at one end to the plow beam, the other end being slotted and receiving said transverse bar, a second member engaging said transverse bar at a point spaced laterally of said first member and connected with said plow beam for generally longitudinal shifting movement relative thereto, and spring means resisting shifting movement of said second member, and a pair of spacers on said transverse bar for determining the spacing between said beams, said spacers being adapted to be disposed either generally centrally of said bar between the inner of said members or one at each end of said transverse bar laterally outwardly of the outer of said members, so as to provide for attaching plow bottoms of different sizes to said beams.

3. A plow comprising means serving as a supporting frame, a plow beam, means connecting said plow beam with said frame to accommodate generally vertical swinging movement relative thereto but preventing generally oscillatory movement of said beam relative to said supporting frame means about a generally longitudinal axis, said connecting means comprising a transverse bar on the supporting frame means, a first member fixed at one end to the outside of said plow beam and extending laterally inwardly and forwardly, the forward end being slotted and receiving said transverse bar, a second member engaging said transverse bar at a point spaced laterally of said first member, the latter having an opening adjacent the end of the beam through which said second member passes, an eyebolt carried by said beam and receiving the rear portion of said second member, and a spring acting at its rear end against said second member and at its forward end against said eyebolt to cushion the transmission of pulling forces to said beam.

4. A plow hitch construction comprising a Z-shaped member having one end adapted to be secured to the forward end of a plow beam, the other end of said Z-shaped member being apertured, and a second member disposed generally laterally of said apertured portion and having an aperture substantially in lateral registration therewith, means movably connecting said second member to the plow beam, and spring means yieldably resisting movement of said second member relative to said plow beam.

5. A plow comprising means serving as a supporting frame, a plow beam, and means connecting said plow beam with said frame comprising a transverse bar on the supporting frame, a first member fixed rigidly at one end to the plow beam so as to move therewith at all times, the other end being offset laterally, the offset section being slotted longitudinally, and receiving said transverse bar, and a second member engaging said transverse bar at a point spaced laterally of the longitudinally slotted part of said first member and connected with said plow beam so as to be shiftable generally longitudinally of said plow beam.

6. A plow comprising means serving as a supporting frame, a plow beam, and means connecting said plow beam with said frame to accommodate generally vertical swinging movement relative thereto but preventing generally oscillatory movement of said beam relative to said supporting frame means about a generally longitudinal axis, said connecting means comprising a transverse bar on the supporting frame means, a first member fixed at one end to the plow beam, the other end being slotted and receiving said transverse bar, said first member having a laterally offset section with an aperture therein, and a second member extending generally longitudinally of the plow beam through said last mentioned aperture and connected at its rear end with said beam, said second member at its forward end engaging said transverse bar at a point spaced laterally of said first member.

7. A plow comprising means serving as a supporting frame, a plow beam and means connecting said plow beam with said frame comprising a pair of members, each adapted to be secured rearwardly to said plow beam, said members respectively including laterally spaced sections, one section being apertured and the other section having a generally longitudinally extending slot therein, the member having the apertured section being movable relative to the other member, means cushioning the movement of said apertured member relative to the other, and a hitch member adapted to be secured to said supporting frame in laterally extending relation and extending through said slot and said aperture, said plow beam being adapted to swing generally laterally about the apertured section as a center, limited by the longitudinally extending slot in the companion section.

8. A hitch construction for a plow including a plow beam, comprising a generally Z-shaped member secured at one end rigidly to the plow beam and including at the other end a forwardly extending section disposed laterally of the vertical longitudinal plane of the plow beam, the intermediate portion of said Z-shaped member having an opening therethrough and said laterally offset section being apertured, and a second member slidably extending through said opening and movably connected at its rear end with said plow beam.

9. A two-way plow comprising means serving as a supporting frame, a pair of plow beams, a transverse member carried by said frame means, means connecting each plow beam with said transverse member, comprising a first part fixed at one end to the plow beam, the other end being offset laterally and slotted to receive said transverse member, a second part engaging said transverse member at a point spaced laterally of said first part and connected with said plow beam, and spacing means on said transverse member for determining the spacing between said plow beams, said spacing means being adapted to be disposed either generally centrally of said transverse member between the inner of said parts or at each end of said transverse member laterally outwardly of the outer of said parts.

10. A two-way plow comprising means serving as a supporting frame, a pair of plow beams, a transverse member carried by said frame means, means connecting each plow beam with said transverse member, comprising a first part fixed at one end to the plow beam, the other end being offset laterally and slotted to receive said transverse member, a second part engaging said transverse member at a point spaced laterally of said first part and connected with said plow beam, and a pair of spacers on said transverse member for determining the spacing between said plow beams, said spacers being adapted to be disposed either generally centrally of said transverse member between the inner of said parts or one at each end of said transverse member laterally outwardly of the outer of said parts, so as to provide for attaching plow bottoms of different sizes to said beams.

11. A plow comprising means serving as a supporting frame, a plow beam, means connecting said plow beam with said frame to accommodate generally vertical swinging movement relative thereto and preventing generally oscillatory movement of said beam relative to said supporting frame means about a generally longitudinal axis, said connecting means comprising a transverse bar on the supporting frame means, a first member fixed at one end to said plow beam and extending generally laterally inwardly and forwardly, the forward end being apertured and receiving said transverse bar, a second member engaging said transverse bar at a point spaced laterally of said first member, the latter having an opening adjacent the end of the beam through which said second member passes, and means for securing the second member to said plow beam.

12. A plow comprising means serving as a supporting frame, a plow beam, means connecting said plow beam with said frame to accommodate generally vertical swinging movement relative thereto and preventing generally oscillatory movement of said beam relative to said supporting frame means about a generally longitudinal axis, said connecting means comprising a transverse bar on the supporting frame means, a first member fixed at one end to said plow beam and extending generally laterally inwardly and forwardly, the forward end being apertured and receiving said transverse bar, a second member engaging said transverse bar at a point spaced laterally of said first member, the latter having an opening adjacent the end of the beam through which said second member passes, means connecting said second member with said plow beam for generally longitudinal movement relative to the latter and said first member, and means for limiting the longitudinal movement of said second member.

13. A plow hitch construction for a plow beam, comprising a first member adapted to be fixed at one end to the plow beam and including a section extending laterally inwardly and forwardly, the forward end being apertured, a second member disposed laterally of said apertured section and also apertured, said second member having a sliding engagement with said first member and disposed adjacent the plow beam, an eyebolt carried by said plow beam and receiving the rear portion of said second member, and a spring acting at its rear end against said second member and at its forward end against said eyebolt.

14. A hitch construction as defined in claim 8, further characterized by a transverse hitch member extending through the laterally offset apertured portion of said Z-shaped member and connected with the forward part of said second member.

15. A two-way plow comprising means serving as a supporting frame, a pair of plow beams, a transverse bar, a pair of brackets on said frame means receiving the ends of said transverse bar, means connecting each plow beam with said transverse bar, comprising a first member fixed at one end to the plow beam, the other end being slotted and receiving said transverse bar, a second member engaging said transverse bar at a point spaced laterally of said first member and connected with said plow beam so as to be shiftable generally longitudinally of said plow beam, and spring means resisting shifting movement of said second member, and a pair of spacers on said transverse bar for determining the spacing between said beams.

AUSTIN E. YOUNG.

---

CERTIFICATE OF CORRECTION.

Patent No. 2,383,698.      August 28, 1945.

AUSTIN E. YOUNG.

It is hereby certified that error appears in the printed specification of the above numbered patent requiring correction as follows: Page 2, second column, lines 56 and 57, strike out the words "so as to move therewith at all times"; and that the said Letters Patent should be read with this correction therein that the same may conform to the record of the case in the Patent Office.

Signed and sealed this 18th day of December, A. D. 1945.

Leslie Frazer (Seal)      First Assistant Commissioner of Patents.

and extending generally laterally inwardly and forwardly, the forward end being apertured and receiving said transverse bar, a second member engaging said transverse bar at a point spaced laterally of said first member, the latter having an opening adjacent the end of the beam through which said second member passes, and means for securing the second member to said plow beam.

12. A plow comprising means serving as a supporting frame, a plow beam, means connecting said plow beam with said frame to accommodate generally vertical swinging movement relative thereto and preventing generally oscillatory movement of said beam relative to said supporting frame means about a generally longitudinal axis, said connecting means comprising a transverse bar on the supporting frame means, a first member fixed at one end to said plow beam and extending generally laterally inwardly and forwardly, the forward end being apertured and receiving said transverse bar, a second member engaging said transverse bar at a point spaced laterally of said first member, the latter having an opening adjacent the end of the beam through which said second member passes, means connecting said second member with said plow beam for generally longitudinal movement relative to the latter and said first member, and means for limiting the longitudinal movement of said second member.

13. A plow hitch construction for a plow beam, comprising a first member adapted to be fixed at one end to the plow beam and including a section extending laterally inwardly and forwardly, the forward end being apertured, a second member disposed laterally of said apertured section and also apertured, said second member having a sliding engagement with said first member and disposed adjacent the plow beam, an eyebolt carried by said plow beam and receiving the rear portion of said second member, and a spring acting at its rear end against said second member and at its forward end against said eyebolt.

14. A hitch construction as defined in claim 8, further characterized by a transverse hitch member extending through the laterally offset apertured portion of said Z-shaped member and connected with the forward part of said second member.

15. A two-way plow comprising means serving as a supporting frame, a pair of plow beams, a transverse bar, a pair of brackets on said frame means receiving the ends of said transverse bar, means connecting each plow beam with said transverse bar, comprising a first member fixed at one end to the plow beam, the other end being slotted and receiving said transverse bar, a second member engaging said transverse bar at a point spaced laterally of said first member and connected with said plow beam so as to be shiftable generally longitudinally of said plow beam, and spring means resisting shifting movement of said second member, and a pair of spacers on said transverse bar for determining the spacing between said beams.

AUSTIN E. YOUNG.

CERTIFICATE OF CORRECTION.

Patent No. 2,383,698.     August 28, 1945.

AUSTIN E. YOUNG.

It is hereby certified that error appears in the printed specification of the above numbered patent requiring correction as follows: Page 2, second column, lines 56 and 57, strike out the words "so as to move therewith at all times"; and that the said Letters Patent should be read with this correction therein that the same may conform to the record of the case in the Patent Office.

Signed and sealed this 18th day of December, A. D. 1945.

Leslie Frazer (Seal)     First Assistant Commissioner of Patents.